Nov. 2, 1965     J. H. LANDVATER     3,215,217
WEIGHT LOADING DEVICE FOR BEAM
BALANCE WEIGHING SCALES

Filed Jan. 20, 1964     2 Sheets-Sheet 1

INVENTOR.
John H. Landvater,
BY Richard W. Cifelli,
Attorneys

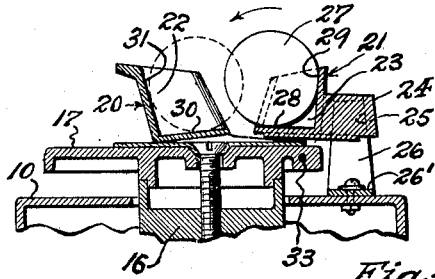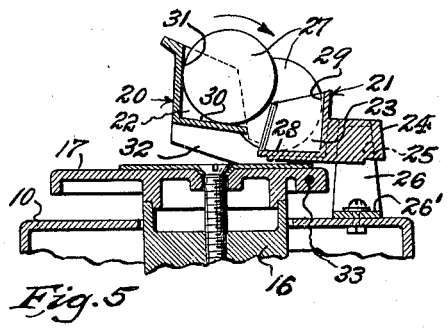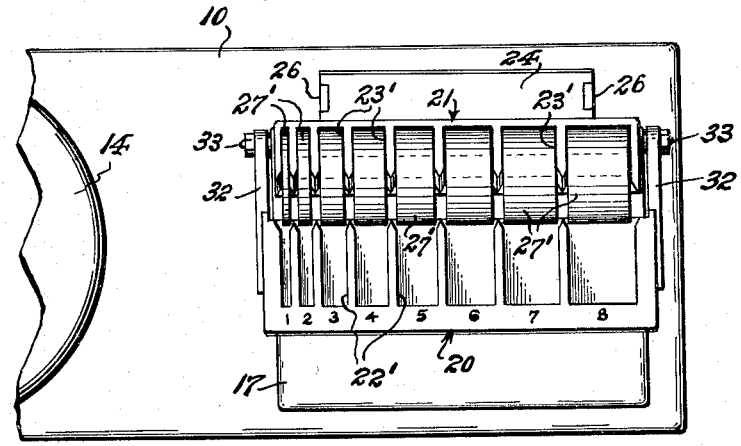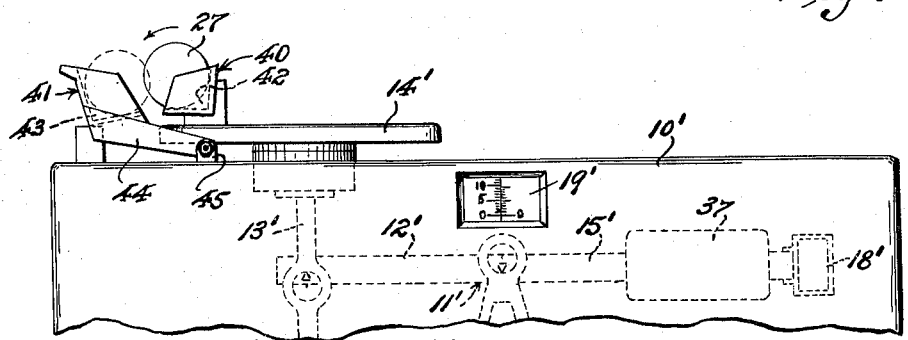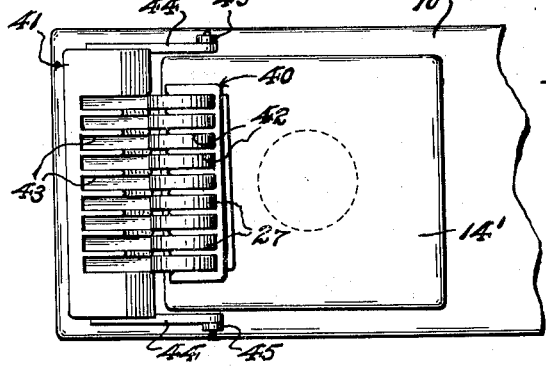

United States Patent Office 3,215,217
Patented Nov. 2, 1965

3,215,217
WEIGHT LOADING DEVICE FOR BEAM
BALANCE WEIGHING SCALES
John H. Landvater, South Berkeley Heights, N.J., assignor to Ohaus Scale Corporation, Union, N.J., a corporation of New Jersey
Filed Jan. 20, 1964, Ser. No. 338,920
2 Claims. (Cl. 177—248)

This invention relates to beam balance weighing scales generally and, more particularly, to beam balance scales of the optical indicating type, both those operating on the balance weighing principle and those operating on the substitution weighing principle.

In the use of a beam balance weighing scale of the optical indicating type operating on the balance weighing principle, an object of unknown weight is deposited upon one platform or pan which is supported by one arm of the pivoted scale beam, and counterbalancing weight, up to a predetermined selected total of weight measuring units, is applied to the other platform or pan which is supported by the opposite arm of the scale beam. If the weight of the object exceeds the initial counterbalancing weight, additional standard weights, in increments equal to the initial counterbalancing weight, are manually deposited by the operator successively upon said other platform or pan, until the known weight values counterbalance the unknown weight value, and thus the weight of the object is determined by the value of the added standard weights plus the weight indication optically displayed on the projection screen of the scale.

In the use of a beam balance scale of the optical indicating type operating on the substitution weighing principle, one arm of the scale beam is loaded with a fixed weight of selected total value, and the other arm of said beam supports a platform or pan to receive the object of unknown weight. On said platform or pan are initially deposited a plurality of removable standard weights of suitable increments of weight measuring units, the total value of said removable weights being equal to the value of the aforesaid fixed weight, thereby bringing the scale beam into equilibrium or balance. The object, weight of which is to be determined, is now deposited upon the platform or pan, thus overbalancing the scale beam, whereupon one or more of the standard weights are removed from the platform or pan until the beam reaches a state of equilibrium or balance. The weight of the object is then determined by the value of the removed standard weights plus the weight indication optically displayed on the projection screen of the scale.

The manual depositing, by the operator, of the standard weights on a scale platform or pan, or removing the same therefrom as the case may be, is a common required practice, and consumes considerable operator effort and time.

Having the above in view, it is an object of this invention to provide beam balance weighing scales generally, and above mentioned optical indicating scales especially, with simple and inexpensive means for quickly and easily applying known standard counterbalancing weights to a scale platform or pan, or removing the same therefrom, as the case may be. The standard weight manipulating or transfer device, according to this invention, facilitates the involved hand operations, whereby to accomplish the same with a minimum need for operator motion and with minimum expenditure of time, while also being adapted to automatically indicate the total number and weight value of the standard weights applied to or removed from a scale platform or pan at any time. The manipulation and movement of said standard weights from one to another of opposed racks, by which the device of this invention is characterized, can be accomplished by finger tip operation which is very easy and rapid.

Another object of this invention is to provide novel means for manipulating a plurality of movable standard weights which is operatable, after use, to quickly and easily return said weights from a place of use to a stored position, or from a place of retained removed position back to a place of use, as the case may be.

The above stated and other objects will become apparent from a reading of the following description of illustrative embodiments of this invention in connection with the accompanying drawings thereof in which drawings:

FIG. 1 is a plan view of a beam balance weighing scale of the optical indicating type adapted to operate on the balance weighing principle, and equipped with a weight loading device according to this invention; FIG. 2 is a front elevational view of the same, showing the beam balance mechanism by broken lines; FIG. 3 is a fragmentary end elevational view of the same, viewed from the right in FIG. 1; FIG. 4 is a fragmentary cross-sectional view, taken on line 4—4 in FIG. 1; and FIG. 5 is a cross-sectional view, similar to that of FIG. 4, but showing the operation of the weight loading device when returning used weights to normal stored position.

FIG. 7 is a fragmentary front elevational view of a modified form of the weight loading device according to this invention.

FIG. 8 is a fragmentary front elevational view of a beam balance weighing scale of the optical indicating type adapted to operate on the substitution weighing principle, and equipped with a weight loading device according to this invention; and FIG. 9 is a fragmentary plan view of the platform or pan end thereof.

Like characters of reference are applied in the several above described views, to indicate corresponding parts.

Figure 1:
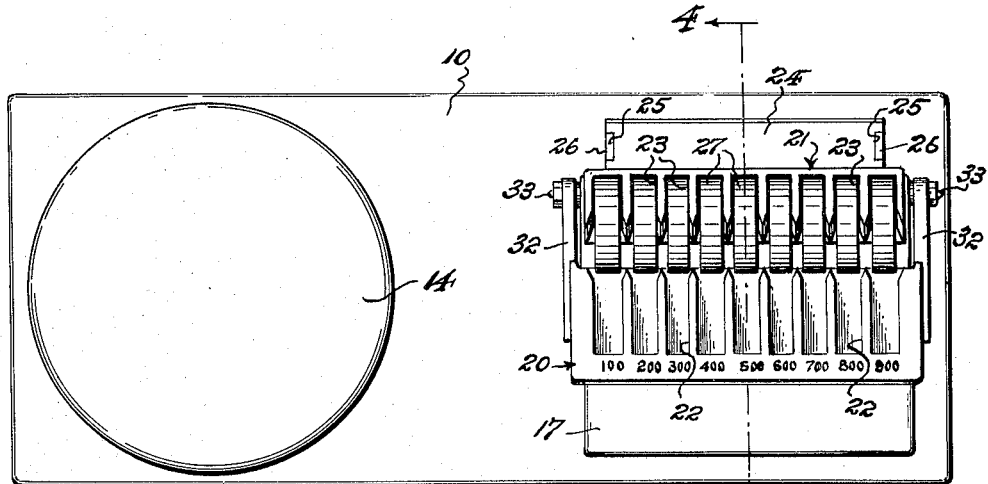
Figure 2:
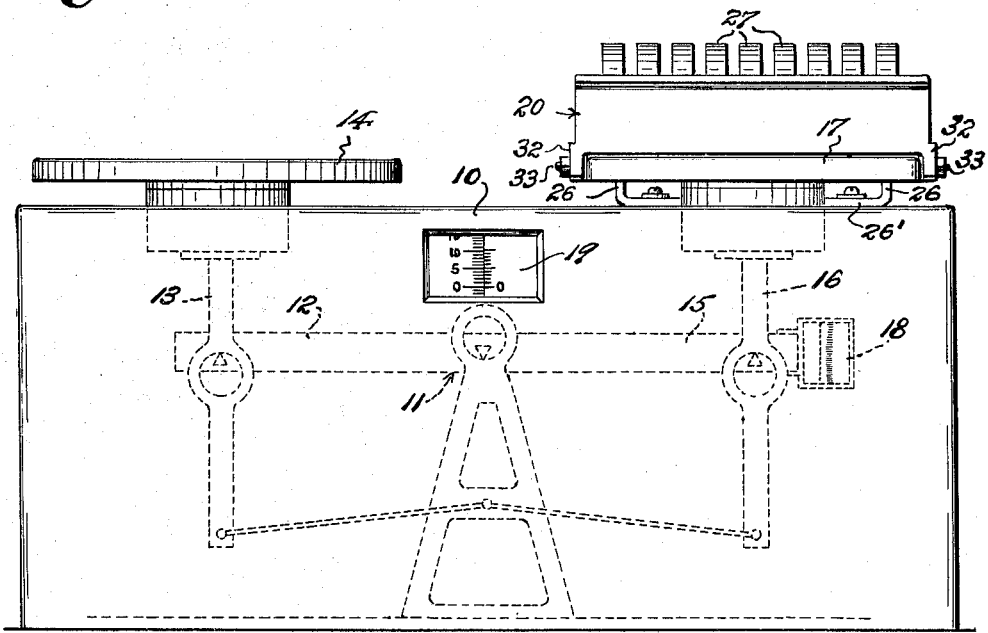

Referring first to FIGS. 1 to 5 inclusive, wherein is shown a beam balance weighing scale of the optical indicating type adapted to operate on the balance weighing principle, the same comprises a suitable housing 10 which contains the beam balance mechanism. The beam balance mechanism (which is schematically shown by broken lines in FIG. 2) comprises a pivotally supported beam 11, upon one arm 12 of which is pivotally mounted the support 13 of a platform or pan 14, upon which an object of unknown weight can be deposited. Said platform or pan 14 is accessibly positioned above the top of the housing 10. Upon the other arm 15 of the beam 11 is pivotally mounted the support 16 of a counterbalance platform 17, which is also accessibly positioned above the top of the housing 10.

Associated with the beam balance mechanism is an ascertained weight optical indicating system of any kind well known to the art, and which, illustratively, comprises a transparent weight indicative optical element 18, having inscribed thereon a scale graduated to provide selected units of weight measurement up to a desired maximum, said element 18 being mounted on an arm (e.g. arm 15) of the scale beam 11. A light source (not shown) issues a beam of light through said element 18. Mounted in connection with a wall of the housing 10 (e.g., the front wall as shown) is a projection screen 19. The beam of light directed through the element 18 is, by suitable reflecting means (not shown), transmitted to the projection screen 19, whereby to visibly display thereon the ascertained weight of the object examined which is indicated by the scale beam positioned element 18, within the maximum of the weight indication comprehended by said element.

The weight loading device, according to this invention, is associated with the counterbalance platform 17, and comprises an operative weight rack 20, which is mounted on said platform 17, and a stationary weight storage or retainer rack 21, which is mounted on the top of the housing 10, in adjacent and opposed relation to said operative rack 20. The rack 20 comprises an elongated body adapted to rest upon the platform 17, in upstanding relation thereto. Said rack 20 is divided into a suitable number of addable weight member receiving compartments 22, which open outwardly toward the opposed storage or retainer rack 21. The compartments of each rack are separated by upstanding walls, the upper edges of which are beveled or shaped so as to guide the weights into the compartments. In like manner, the storage or retainer rack 21 also comprises an elongated upstanding body, which is divided into a corresponding number of addable weight members receiving compartments 23, that open inwardly toward those of the opposed operative rack 20.

The storage or retainer rack 21 can be supported, in its stationary position, upon the top of the scale housing 10 by any suitable means adapted to dispose the same at a level in desired opposition to the operative rack 20. Illustratively (as shown) the means for so supporting said storage or retainer rack 21 comprises a bracket member 24 of suitable length, that projects rearwardly from the rack body, and which is provided, in the ends thereof, with socket formations 25, adapted to receive respective upstanding carrier posts or standards 26, which extend from a base member 26' that is fixedly attached to the scale housing 10. Preferably, said carrier posts or standards 26 and said socket formations 25 are tapered, whereby to assure desired positioning of the rack 21, and so as to firmly hold said rack against inadvertent displacement from such position.

Initially, the compartments 23 of the stationary storage or retainer rack 21 are adapted to hold a plurality of removable addable counterbalancing weight members 27. These weight members 27 are each sized to provide a weight value equal to the maximum weight which can be indicated by the optical weight indicative element 18, and said weight members 27 are desirably in the form of rollable circular discs. Preferably, the storage or retainer rack 21 is so formed that the bottom walls 28 of its compartments 23 incline downwardly from the open ends of the latter to the back walls 29 thereof, thus holding the contained weight members 27 against displacement from the compartments, except by operator finger exerted force applied thereto.

In like manner, the operative rack 20 is so formed that the bottom walls 30 of the compartments 22 thereof incline downwardly and inwardly from the open ends of said compartments to the back walls 31 of the latter, thus holding weight members 27, deposited in the compartments in use, against accidental displacement therefrom.

The operative rack 20, which is supported upon the counterbalance platform 17, is preferably, but not necessarily, connected with the latter so as to be capable of upswinging lift, whereby to permit roll back of any weight members 27, which have, in use, been entered into the compartments 22 thereof, to move out therefrom, under gravity, back into the compartments 23 of the storage or retainer rack 21, so as to be thus quickly and simultaneously returned to the latter after use. To this end, the body of the operative rack 20 is provided, at its respective ends, with lever arms 32 unitary therewith. Said lever arms 32 straddle the counterbalance platform 17, and extend toward the stationary storage or retainer rack 21. The ends of said lever arms 32 are connected with the platform 17 by suitable pivoting means 33 (see FIG. 5).

To illustrate the operation of the weighing scale and the addable weight loading device associated therewith as above described, assume that the weight measuring unit is the gram; that the platform 17 and rack 20 supported thereon, when empty, balances the platform or pan 14; that the optical indicative element 18 is graduated to indicate grams from zero up to one hundred grams; and that each addable counterbalance weight 27 is of the value of one hundred grams. An object of unknown weight, when deposited upon the platform or pan 14, causes the scale beam 11 to turn about its pivotal support. If the weight of the object is less than one hundred grams, its ascertained weight in grams will be determined by the position of the optical indicative element 18, and will be displaced on the projection screen 19, all in manner well known to the art. If, however, the weight of the object is in excess of one hundred grams, the operator rolls one or more counterbalance weights 27 from the storage or retainer rack 21 into the operative rack 20, until the scale beam 11 is brought into a condition of equilibrium. The weight of the object examined will now be indicated by the total value of the added weights 27 plus that part of one hundred grams determined by the operation of the optical indicative element 18. The transfer of weights 27 from the storage or retainer 21 to the operative rack 20, can be quickly and easily accomplished by application of the operator's finger tip to the selected weights, whereby to effect rolling movement of the weights to the operative rack (see FIG. 4).

Figures 3, 6:
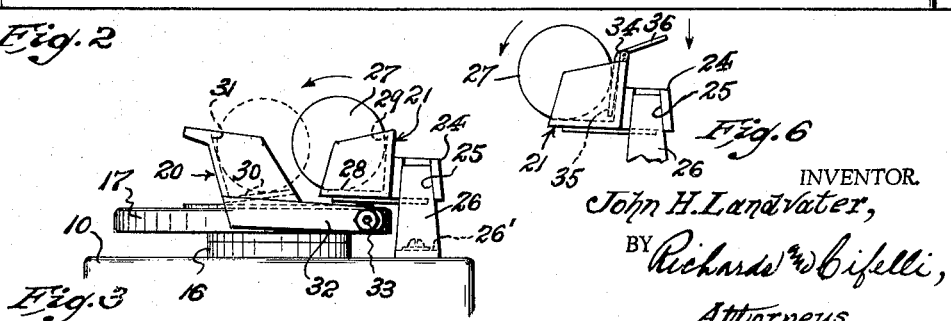
FIG. 6 is a fragmentary view, similar to that of FIG. 3, but showing a modification of the weight loading device.

Another optional means for and method of transferring the addable weights 27 from the storage or retainer rack 21 to the operative rack 20 is shown in FIG. 6. This means comprises kicker levers 34, which are pivotally supported respectively in connection with the back walls 29 of the respective compartments 23 of said rack 21. Each lever 34 is provided with a kicker arm 35 which extends into the served rack compartment 23, behind its contained movable weight 27, and a finger piece 36 which inclines upwardly and rearwardly from the pivotal connection of the lever 34. To eject a weight 27 from a compartment of rack 21 into a corresponding compartment 22 of the operative rack 20, the operator presses down upon the finger piece 36, thus rocking the lever 34 to swing forward the kicker arm 35, so that the latter kicks or propels the engaged weight 27 outwardly from the rack 21 into the rack 20.

Referring now to FIGS. 8 and 9, wherein is shown a beam balance weighing scale of the optical indicating type adapted to operate on the substitution weighing principle. This type of scale also comprises a suitable housing 10' which contains the beam balance mechanism (schematically shown by broken lines in FIG. 8, the latter comprising a pivotally supported beam 11', upon one arm 12' of which is pivotally mounted the support 13' of a platform or pan 14', upon which an object of unknown weight can be deposited. Said platform or pan 14' is accessibly positioned above the top of the housing 10'. Upon the other arm 15' of the beam 11' is attached a balance weight 37. Associated with the beam balance mechanism is an ascertained weight optical indicating system of any kind well known to the art, and which, illustratively includes a weight indicative optical element 18' and a projection screen 19', together with a light source and light beam reflecting means (not shown), similar to that already hereinabove described.

In this type of beam balance scale which is adapted to operate on the substitution weighing principle, a weight loading device, according to this invention, is associated with the platform or pan 14', and comprises an operative weight rack 40, which is mounted on said platform or pan 14', preferably at the outer end portion thereof, and a retainer rack 41, which is mounted on the top of the casing 10', in adjacent and opposed relation to said operative rack 40. Both racks 40 and 41 are respectively formed to provide a suitable number of compartments 42 and 43, the open ends of which are opposed. The compartments 42 of the operative rack 40 are adapted to initially hold a plurality of movable weights 27, each equal in value to the maximum weight indicatable by the optical indicative element 18'. The thus weight loaded operative rack 40 and the supporting platform or pan 14' normally balance the beam balance weight 37.

In the use and operation of this type of balance beam scale, an object of unknown weight is deposited upon the platform or pan 14', thus causing the scale beam 11' to turn about its pivotal support. If the weight of the object is less than the maximum weight indicatable by the optical indicative element 18', the ascertained weight will be displayed on the projection screen 19'. If, however, the weight of the object is in excess of the maximum weight indicatable by the optical indicative element 18', one or more movable weights 27 are transferred from the operative rack 40 to the retainer rack 41, until the scalebeam 11' is brought into a condition of equilibrium. The weight of the object examined will now be indicated by the total value of the weights 27 removed from the operative rack 40 and platform or pan 14' plus that part of ascertained weight determined by the optical indicative element 18'.

The retainer rack 41 is preferably, but not necessarily, supported upon the housing 10' so as to be capable of upswinging lift, whereby to permit weights 27 removed from the operative rack 40 to be returned, by gravity, back to the latter, after use. To this end the retainer rack 41 is provided, at its respective ends, with lever arms 44 unitary therewith, and disposed to extend toward the operative rack 40. Said lever arms 44 straddle the platform or pan 14', and the ends thereof are pivotally connected with stationary fulcrum posts or ears 45 that are affixed to the scale housing 10'.

Although with respect to balance beam scales of the optical weight indicating type, such as above described, it is preferable that the plurality of movable weights be of equal weight value, it is within the scope of this invention that a series of weights of progressively increasing size and value, on the basis of a selected unit of weight measurement, be employed. In such case, the racks 20 and 21 are respectively provided with compartments 22' and 23' which are progressively increased in size to accommodate the respective sizes of movable weights 27' (see FIG. 7). This arrangement is especially well adapted for use in a scale for weighing out material to a desired weight amount.

It will be understood that various changes or modifications may be made in the hereinabove described illustrative weight loading devices, and in the details thereof, without departing from the spirit and scope of my invention, and that only such limitations shall be imposed as are required by and indicated in the appended claims.

I claim:

1. A weight loading device for a weighing scale, comprising an operative rack and a retainer rack mounted on support means therefor in adjacent opposed relation, a plurality of movable counterbalance weights adapted to be transferred from one to the other of said racks and back again as occasion may require, each of said racks being provided with a plurality of compartments each opening toward a corresponding compartment in the opposite rack and being adapted to contain only one of said weights, each compartment of said retainer rack being provided with a kicker lever pivotally mounted thereabove and having an arm extending downwardly into said compartment and a finger piece extending upwardly and rearwardly from said compartment, whereby finger pressure on said finger piece is adapted to pivot said kicker lever causing said arm to act against a weight in the compartment of said retainer rack to move it out of said compartment and into the opposite corresponding compartment of said operative rack, and said operative rack being pivotally mounted for upswinging movement relative to the retainer rack, whereby to effect gravitational return movement of the counterbalance weights from said operative rack to said retainer rack after use.

2. In combination with a beam balance weighing scale having a housing to enclose a balance beam mechanism including a pivotally supported beam, one arm of which beam supports a platform disposed externally of the housing, a weight loading device comprising an operative rack and a retainer rack mounted on support means therefor in adjacent opposed relation, a plurality of movable counterbalance weights adapted to be transferred from one to the other of said racks and back again as occasion may require, each of said racks being provided with a plurality of compartments each opening toward a corresponding compartment in the opposite rack and being adapted to contain only one of said weights, each compartment of said retainer rack being provided with a kicker lever pivotally mounted thereabove and having an arm extending downwardly into said compartment and a finger piece extending upwardly and rearwardly from said compartment, whereby finger pressure on said finger piece is adapted to pivot said kicker lever causing said arm to act against a weight in the compartment of said retainer rack to move it out of said compartment and into the opposite corresponding compartment of said operative rack, and said operative rack being pivotally mounted for upswinging movement relative to the retainer rack, whereby to effect gravitational return movement of the counterbalance weights from said operative rack to said retainer rack after use.

References Cited by the Examiner
UNITED STATES PATENTS

| | | | |
|---|---|---|---|
| 279,864 | 6/83 | Farnum | 177—248 |
| 475,792 | 5/92 | McClelland | 177—248 |
| 480,027 | 8/92 | McClelland | 177—248 X |

LEO SMILOW, *Primary Examiner.*